US012678705B2

(12) United States Patent
Khoruzhik

(10) Patent No.: US 12,678,705 B2
(45) Date of Patent: Jul. 14, 2026

(54) MOBILE STAGE SYSTEM

(71) Applicant: Dmitry Khoruzhik, Moscow (RU)

(72) Inventor: Dmitry Khoruzhik, Moscow (RU)

(*) Notice: Subject to any disclaimer, the term of this patent is extended or adjusted under 35 U.S.C. 154(b) by 331 days.

(21) Appl. No.: 18/690,777

(22) PCT Filed: Mar. 15, 2022

(86) PCT No.: PCT/RU2022/050079
§ 371 (c)(1),
(2) Date: Mar. 11, 2024

(87) PCT Pub. No.: WO2023/043331
PCT Pub. Date: Mar. 23, 2023

(65) Prior Publication Data

US 2025/0135373 A1 May 1, 2025

(30) Foreign Application Priority Data

Sep. 14, 2021 (RU) ........................... RU2021126975

(51) Int. Cl.
*A63J 5/02* (2006.01)
*F21V 21/15* (2006.01)
*F21W 131/406* (2006.01)

(52) U.S. Cl.
CPC ................. *A63J 5/02* (2013.01); *F21V 21/15* (2013.01); *F21W 2131/406* (2013.01)

(58) Field of Classification Search
CPC ..... A63J 5/02; F21V 21/15; F21W 2131/406; G06F 3/00
See application file for complete search history.

(56) References Cited

U.S. PATENT DOCUMENTS

| | | | | |
|---|---|---|---|---|
| 9,197,918 | B2 | 11/2015 | Li et al. | |
| 10,353,562 | B2 * | 7/2019 | Niemantsverdriet .. | H05B 47/19 |
| 10,718,494 | B1 * | 7/2020 | Nielsen ............... | F21V 23/0492 |
| 10,723,455 | B1 * | 7/2020 | Hovey ...................... | A63J 5/02 |
| 11,148,067 | B1 * | 10/2021 | Maritato ............... | A63J 19/006 |

(Continued)

FOREIGN PATENT DOCUMENTS

| | | | |
|---|---|---|---|
| CN | 109040618 | A | 12/2018 |
| RU | 2583772 | C1 | 5/2016 |

OTHER PUBLICATIONS

International Search Report for International Application No. PCT/RU2022/050079.

(Continued)

*Primary Examiner* — Michael B. Pierorazio
(74) *Attorney, Agent, or Firm* — Perilla Knox & Hildebrandt LLP; Kenneth A. Knox

(57) ABSTRACT

Devices for creating stage effects and, more particularly, to mobile stage structures for theatrical productions are described. A mobile stage system comprises a device for creating an ambient light effect, stage decorations, curtains, and/or other accoutrements of a staged event, and a data carrier containing, in an encoded form, at least one master file including information about a set of scenes and actions, where each scene and action corresponds to a specific value of a time segment from a time reference point, and an executable file. Adaptable stage effects are produced on the basis of changing external factors, inter alia, on the basis of artificial intelligence (AI) technology.

20 Claims, 1 Drawing Sheet

(56) References Cited

U.S. PATENT DOCUMENTS

| | | | | |
|---|---|---|---|---|
| 2005/0200306 | A1* | 9/2005 | Conway | G03B 15/02<br>315/307 |
| 2005/0259117 | A1* | 11/2005 | Rackham | A63J 5/00<br>345/619 |
| 2011/0018462 | A1* | 1/2011 | Lowe | H04N 21/4131<br>362/249.02 |
| 2015/0092110 | A1* | 4/2015 | Li | H04N 21/816<br>348/602 |
| 2019/0244395 | A1* | 8/2019 | Hyun | G06F 3/0485 |
| 2020/0105292 | A1* | 4/2020 | Large | G06N 3/04 |
| 2021/0205999 | A1* | 7/2021 | Mecca | B25J 11/0015 |
| 2021/0310636 | A1* | 10/2021 | Melzner | H05B 47/155 |
| 2022/0323874 | A1* | 10/2022 | Jeromin | A63G 31/00 |
| 2025/0142029 | A1* | 5/2025 | Eck | H04N 9/3141 |

OTHER PUBLICATIONS

Written Opinion for International Application No. PCT/RU2022/050079.

* cited by examiner

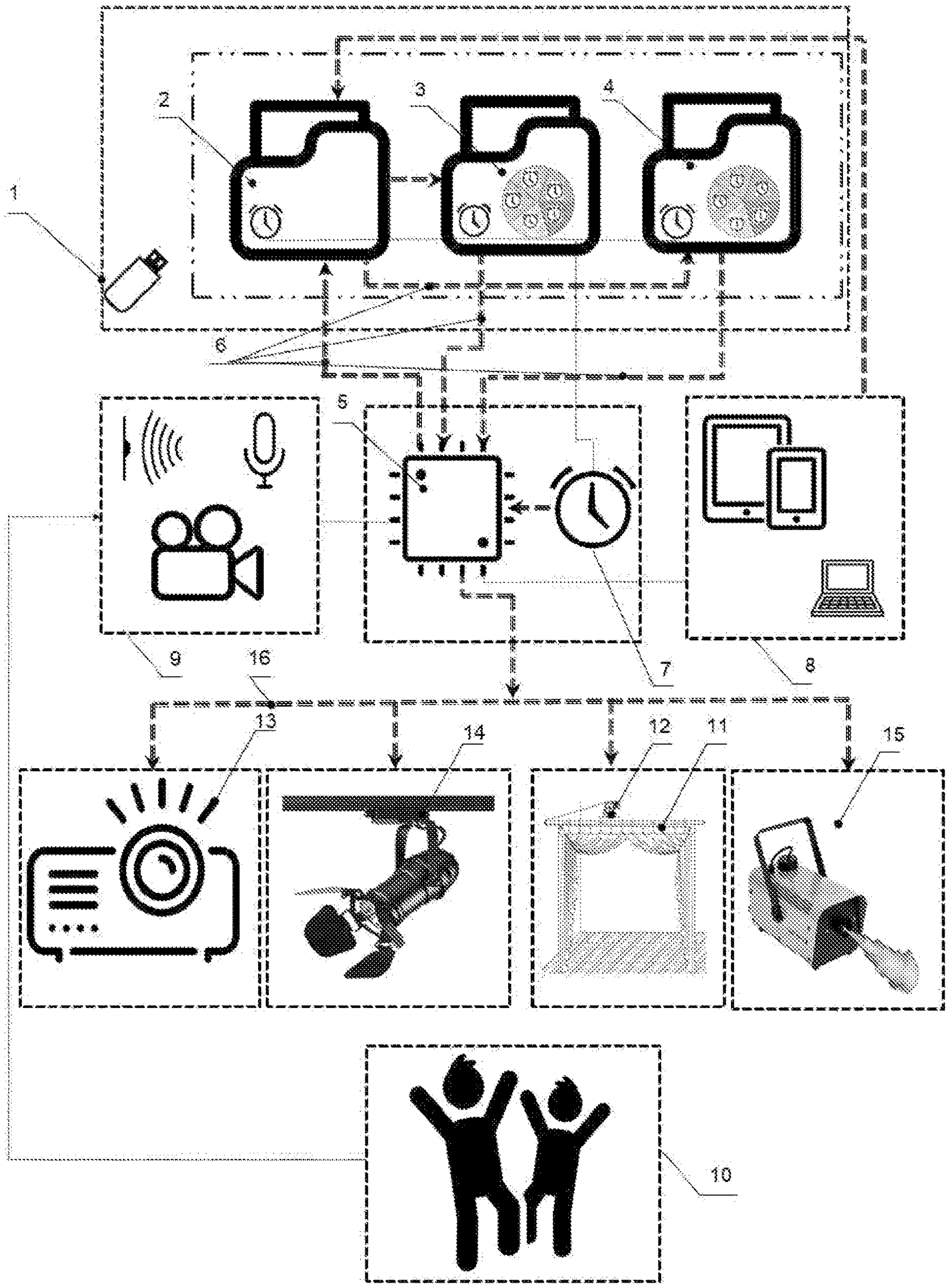
1
2
3
4
5
6
7
8
9
10
11
12
13
14
15
16

MOBILE STAGE SYSTEM

CROSS-REFERENCE TO RELATED APPLICATIONS

The present application is a national phase application under 35 U.S.C. § 371 of International Application No. PCT/RU2022/050079 entitled "MOBILE STAGE SYSTEM," filed Mar. 15, 2022, which claims the benefit of and priority to Russian Federation Patent Application No. 2021126975 filed Sep. 14, 2021, the contents of both of which being incorporated by reference in their entireties herein.

TECHNICAL FIELD

The present disclosure relates to devices for creating stage effects and, more particularly, to mobile stage structures for stage performances and games, including those involving children.

BACKGROUND

A device, disclosed in Russian Federation Patent No. RU 2583772 C1 for "Mobile Stage Module", by V. S. Zharkevich et al., published on May 10, 2016, is known in the related field. A disadvantage of the device includes the lack of a solution for controlling lighting effects, actuators of auxiliary structures and decorations within the module.

A device for generating lighting effects, disclosed in U.S. Pat. No. 9,197,918 B2, by Megan Farrell et al., published on Nov. 24, 2015, is also known in the related field. This device is recognized as a prototype. A disadvantage of the prototype is the inability to change stage effects when exposed to external factors, as well as the inability to control auxiliary devices, such as curtains and other decorations necessary for a mobile stage system.

BRIEF SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a mobile stage system includes a device for creating an ambient light effect. This device includes a processor and memory with program instructions that direct the processor to analyze an incoming digital video file containing at least one scene. The processor detects, based on information in the digital video file, the scene to be associated with at least one ambient light effect. The system also includes electromechanical actuators with a control system for providing specified movements. Stage decorations, curtains, and accoutrements of a staged event are automatically moved using these actuators. The system also includes a data carrier containing at least one master file with information about a set of scenes and actions in the form of a sequence of time segments. The processor includes a real-time and relative-time clock timer with at least one feedback input for connecting at least one external device that affects the sequence of time segments taken from the master file.

According to other aspects of the present disclosure, the mobile stage system may include a processor directed to perform operations using at least one artificial intelligence (AI) routine. The system may also include at least one of: a light sensor, a geolocation sensor, a participant voice sound recognition device, an external environment sound recognition device, a participant positioning sensor, an object positioning sensor, a participant psychoemotional state data sensor, and a physical state data sensor, connected to the feedback input of the processor. The system may also include an information input device connected to a processor feedback input of the processor that enables a change to the sequence of time segments taken from the master file, and operationally interrupts execution of the executable file.

According to another aspect of the present disclosure, a mobile stage system includes at least one hardware processor and program instructions executable on the hardware processor. When executed, these instructions direct the hardware processor to analyze an incoming digital video file containing at least one scene, determine that the scene is associated with at least one ambient light effect, and direct an instruction to be sent to at least one lighting device to create the ambient light effect. The system also includes a real-time and relative-time clock timer with at least one feedback input to connect at least one external device that affects the sequence of time segments taken from the master file.

According to other aspects of the present disclosure, the system may include a processor directed to perform at least one of the provided operations using at least one artificial intelligence (AI) routine. The system may also include at least one of: a light sensor, a geolocation sensor, a participant voice sound recognition device, an external environment sound recognition device, a participant positioning sensor, an object positioning sensor, a participant psychoemotional state data sensor, and a physical state data sensor, configured to provide feedback input of the hardware processor. The system may also include an information input device connected to a processor feedback input of the processor that enables a change to the sequence of time segments taken from the master file, and operationally interrupts execution of the executable file.

According to yet another aspect of the present disclosure, a method includes analyzing an incoming digital video file containing at least one scene, determining that the scene is associated with at least one ambient light effect, and directing an instruction to be sent to at least one lighting device to create the ambient light effect. The method also includes directing at least one electromechanical actuator with a control system to perform a specified movement, accessing at least one master file in an encoded form from a data carrier, and accessing an executable file comprising at least one file. The method also includes using a real-time and relative-time clock timer with at least one feedback input to connect at least one external device to affect the sequence of time segments taken from the master file.

According to other aspects of the present disclosure, the method may include performing at least one of the operations using at least one artificial intelligence (AI) routine. The method may also include providing at least one of: a light sensor, a geolocation sensor, a participant voice sound recognition device, an external environment sound recognition device, a participant positioning sensor, an object positioning sensor, a participant psychoemotional state data sensor, and a physical state data sensor, connected to the feedback input of the processor. The method may also include providing an information input device connected to a processor feedback input of the processor that enables a change to the sequence of time segments taken from the master file, and operationally interrupts execution of the executable file.

The foregoing general description of the illustrative embodiments and the following detailed description thereof are merely exemplary aspects of the teachings of this disclosure and are not restrictive.

BRIEF DESCRIPTION OF DRAWINGS

Many aspects of the present disclosure can be better understood with reference to the following drawing. The components in the drawing are not necessarily to scale, with emphasis instead being placed upon clearly illustrating the principles of the disclosure. Moreover, in the drawing, like reference numerals designate corresponding parts throughout the view.

FIG. 1 shows a schematic structural diagram of the mobile stage system.

DETAILED DESCRIPTION

The technical problem of the proposed disclosure is to create mobile stage systems that produce adaptable stage effects on the basis of changing external factors, inter alia, on the basis of AI (artificial intelligence) technology.

The problem is solved by the proposed device, i.e. a mobile stage system, comprising a device for creating the ambient light effect that consists of a processor configured to analyze an incoming digital video file containing one or more scenes and programmed to analyze the incoming digital video file so as to detect, based on the information contained in the digital video file, at least one scene in the digital video file to be associated with at least one ambient light effect, and programmed to send an instruction from a receiving device to at least one lighting device that supports communication with the receiving device so as to create at least one ambient light effect associated with at least one scene when at least one scene is displayed to a user; characterized in that stage decorations and/or curtains and/or other accoutrements of a staged event that are to be automatically moved using mechanical means are introduced, electromechanical actuators with a control system thereof providing for specified movements of the above-mentioned devices are introduced, a data carrier containing, in an encoded form, at least one master file including information about a set of scenes and actions in the form of at least a sequence of time segments, wherein each scene and action corresponds to a specific value of a time segment from a time reference point, and executable files consisting of at least one video file, at least one file including information about lighting circuitry and/or controlling electromechanical actuators, wherein the executable files contain a timeline with synchronized reference points with time segments of the master file, is introduced, and that the processor is equipped with a real-time and relative-time clock timer and with at least one feedback input for connecting devices that affect the sequence of time segments taken from the master file so that to provide automatic changes in the sequence of time segments of the executable files, including operational interruption of time segments of the executable files.

Another distinguishing feature is that the processor is configured on the basis of AI technology.

Yet another distinguishing feature is the introduction of devices comprising light sensors, and/or geolocation sensors for the mobile stage system, and/or participant voice and/or external environment sound recognition devices, and/or participant and object positioning sensors, and/or participant psychoemotional and physical state data sensors to be connected to the feedback input of the processor and automatically affecting the sequence of time segments taken from the master file.

And finally, yet another distinguishing feature is the introduction of an information input device to be connected to the processor feedback, which enables to manually change the sequence of time segments taken from the master file, as well as to operationally interrupt execution of the executable file.

The indicated features of the disclosure are linked by the cause-and-effect relationship, forming a set of essential features sufficient to achieve the technical result consisting in creation of a mobile stage system configured to create adaptable stage effects on the basis of changing external factors, inter alia, on the basis of AI technology. A proposed device comprises a data carrier 1, such as a memory card, on which at least one master file 2, at least one executable file 3 containing a video file, and at least one executable file 4 including information about lighting circuitry and/or controlling electromechanical actuators or devices are recorded using encryption methods known from the prior art. A processor 5 is used for reading and processing information contained on the data carrier 1 in files 2, 3, and 4, as well as for decoding and converting the said information. The processor 5 is connected via communication channels 6 to files 2, 3, and 4 contained on the data carrier 1. The processor 5 can be implemented on the basis of artificial intelligence technology. A clock-timer 7 ensuring accurate determination of the real or relative time by the processor 5 is introduced, and the master file 2 contains at least a sequence of time segments for enabling the corresponding time segments in the executable files 3 and 4. The time reference points for each of the files 2, 3, and 4 are synchronized, for example, starting from the zero value of the start time. An input device 8 is used to start the device, to forcibly change the sequence of time segments, and to abnormally terminate the operation based on the information contained in the master file 2, wherein the input device 8 can be, for example, a remote console, a tablet computer, a laptop, etc. Sensors 9 connectable to the feedback channels of the processor 5 are used to automatically change the sequence of time segments contained in the master file 2. The sensors 9 can be implemented as light sensors, microphones, video cameras, etc. The sensors 9 can receive information from the participants 10 of the mobile stage system. The processor 5 is connected to actuating devices, such as a curtain of the mobile stage system 11 with an electromechanical actuator 12, a video projector 13, stage lighting 14, auxiliary devices or decorations 15. The actuating devices are connected to the processor 5 via communication channels 16 known from the prior art.

The device can be started manually by sending a corresponding instruction from the input device 8 with a preselected sequence of time segments contained in the master file 2. The master file 2 may also contain other service information, such as a description of the scene, conditions for switching to another time segment, etc. The processor 5, based on the clock-timer 7 and the master file 2, finds the required time segments of video or executive actions, including light scenes, in the executable files 3 and 4, and transmits information via communication channels 16 to the actuating devices, video projectors 13, stage lighting 14, auxiliary devices and decorations 15. Using the sensors 9 and the processor 5, the participants 10 involved in operation of the mobile stage system can automatically change the pre-selected sequence of time segments depending on their activity and other parameters. This may be caused, for example, by insufficient readiness of the participants 10, lack of interest, the need to change the course of a performance, any emergency situation, etc. Based on the sensors 9, the processor 5 configured, for example, on the basis of artificial intelligence technology can automatically change the sequence of time segments contained in the master file 2 depending on the actions of the participants 10. In addition, a signal from the sensors 9 can be initiated by external factors, for example, illumination, given that the system is mobile and can change its location. In this case, the processor 5 changes the sequence 2, for example, with brighter stage light or vice versa, changes its brightness, etc. Files 2, 3, and 4 located on the data carrier 1 are encoded to protect information and prevent it from being used on other devices. The processor 5 is equipped with the information-decoding function.

The invention claimed is:

1. A mobile stage system, comprising:

a device for creating an ambient light effect comprising a processor and memory having program instructions stored thereon that, when executed, direct the processor to analyze an incoming digital video file containing at least one scene; detect, based on information contained in the digital video file, the at least one scene in the digital video file to be associated with at least one ambient light effect; and send an instruction from a receiving device to at least one lighting device that supports communication with the receiving device so as to create the at least one ambient light effect associated with at least one scene when at least one scene is to be performed or shown;

electromechanical actuators with a control system thereof for providing specified movements, and at least one of stage decorations, curtains, and accoutrements of a staged event are automatically moved using the electromechanical actuators with the control system thereof;

a data carrier containing, in an encoded form, at least one master file having information about a set of scenes and actions in the form of at least a sequence of time segments;

wherein each of the scenes and actions in the set corresponds to a specific value of a time segment from a time reference point, and an executable file comprising at least one file, the at least one file comprising information about at least one of: lighting circuitry; video data, and controlling the electromechanical actuators via the control system, wherein the executable file contains a timeline with synchronized reference points with time segments of the master file, and wherein the processor comprises a real-time and relative-time clock timer with at least one feedback input for connecting at least one external device that affects the sequence of time segments taken from the master file so that to provide automatic changes in the sequence of time segments of the executable files, comprising operational interruption of time segments of the executable files.

2. The mobile stage system according to claim 1, wherein the processor is directed to perform operations using at least one artificial intelligence (AI) routine.

3. The mobile stage system according to claim 1, further comprising at least one of: a light sensor, a geolocation sensor, a participant voice sound recognition device, an external environment sound recognition device, a participant positioning sensor, an object positioning sensor, a participant psychoemotional state data sensor, and a physical state data sensor, connected to the feedback input of the processor and is configured to automatically affect the sequence of time segments taken from the master file.

4. The mobile stage system according to claim 1, further comprising an information input device connected to a processor feedback input of the processor that enables a change to the sequence of time segments taken from the master file, and operationally interrupts execution of the executable file.

5. The mobile stage system according to claim 2, further comprising at least one of: a light sensor, a geolocation sensor, a participant voice sound recognition device, an external environment sound recognition device, a participant positioning sensor, an object positioning sensor, a participant psychoemotional state data sensor, and a physical state data sensor, connected to the feedback input of the processor and is configured to automatically affect the sequence of time segments taken from the master file.

6. The mobile stage system according to claim 2, further comprising an information input device connected to a processor feedback input of the processor that enables a change to the sequence of time segments taken from the master file, and operationally interrupts execution of the executable file.

7. The mobile stage system according to claim 3, further comprising an information input device connected to a processor feedback input of the processor that enables a change to the sequence of time segments taken from the master file, and operationally interrupts execution of the executable file.

8. A mobile stage system, comprising:

at least one hardware processor; and program instructions executable on the at least one hardware processor that, when executed, direct the at least one hardware processor to:

analyze an incoming digital video file containing at least one scene;

determine, based on information contained in the digital video file, that the at least one scene in the digital video file is associated with at least one ambient light effect;

direct an instruction to be sent to at least one lighting device to create the at least one ambient light effect associated with at least one scene when at least one scene is to be performed or shown;

direct at least one electromechanical actuator with a control system thereof to perform a specified movement, that adjusts at least one of: a stage decoration, a curtain, and an accoutrement of a staged event;

access, from a data carrier, at least one master file in an encoded form, the at least one master file comprising information about a scene and an action in the form of a sequence of time segments; wherein the scene and the action correspond to a specific value of a time segment from a time reference point;

access an executable file comprising at least one file, the at least one file comprising information about at least one of: lighting circuitry; video data; and controlling the electromechanical actuator via the control system, wherein the executable file comprises a timeline with synchronized reference points with time segments of the master file, and use a real-time and relative-time clock timer with at least one feedback input to connect at least one external device that affects the sequence of time segments taken from the master file so that to provide automatic changes in the sequence of time segments of the executable file, comprising operational interruption of time segments of the executable file.

9. The system according to claim 8, wherein the processor is further directed to perform at least one of the provided operations using at least one artificial intelligence (AI) routine.

10. The system according to claim 8, further comprising at least one of: a light sensor, a geolocation sensor, a participant voice sound recognition device, an external environment sound recognition device, a participant positioning sensor, an object positioning sensor, a participant psychoemotional state data sensor, and a physical state data sensor, connected to the feedback input of the processor and is configured to automatically affect the sequence of time segments taken from the master file.

11. The system according to claim 8, further comprising an information input device connected to a processor feedback input of the processor that enables a change to the sequence of time segments taken from the master file, and operationally interrupts execution of the executable file.

12. The system according to claim 9, further comprising at least one of: a light sensor, a geolocation sensor, a participant voice sound recognition device, an external environment sound recognition device, a participant positioning sensor, an object positioning sensor, a participant psychoemotional state data sensor, and a physical state data sensor, configured to provide feedback input of the at least one hardware processor, the at least one hardware processor being further directed to automatically affect the sequence of time segments taken from the master file based on the feedback input.

13. The system according to claim 9, further comprising an information input device connected to a processor feedback input of the processor that enables a change to the sequence of time segments taken from the master file, and operationally interrupts execution of the executable file.

14. The system according to claim 10, further comprising an information input device connected to a processor feedback input of the at least one hardware processor that enables a change to the sequence of time segments taken from the master file, and operationally interrupts execution of the executable file.

15. A method, comprising:

analyzing, by at least one hardware processor, an incoming digital video file containing at least one scene;

determining, by the at least one hardware processor and based on information contained in the digital video file, that the at least one scene in the digital video file is associated with at least one ambient light effect;

directing, by the at least one hardware processor, an instruction to be sent to at least one lighting device to create the at least one ambient light effect associated with at least one scene when at least one scene is to be performed or shown;

directing, by the at least one hardware processor, at least one electromechanical actuator with a control system thereof to perform a specified movement, that adjusts at least one of: a stage decoration, a curtain, and an accoutrement of a staged event;

accessing, from a data carrier by the at least one hardware processor, at least one master file in an encoded form, the at least one master file comprising information about a scene and an action in the form of a sequence of time segments; wherein the scene and the action correspond to a specific value of a time segment from a time reference point;

accessing, by the at least one hardware processor, an executable file comprising at least one file, the at least one file comprising information about at least one of: lighting circuitry;

video data; and controlling the electromechanical actuator via the control system, wherein the executable file comprises a timeline with synchronized reference points with time segments of the master file, and connecting, by the at least one hardware processor, and using a real-time and relative-time clock timer with at least one feedback input, to at least one external device to affect the sequence of time segments taken from the master file so that to provide automatic changes in the sequence of time segments of the executable file, comprising operational interruption of time segments of the executable file.

16. The method according to claim 15, further comprising performing at least one of the operations using at least one artificial intelligence (AI) routine.

17. The method according to claim 15, further comprising providing at least one of: a light sensor, a geolocation sensor, a participant voice sound recognition device, an external environment sound recognition device, a participant positioning sensor, an object positioning sensor, a participant psychoemotional state data sensor, and a physical state data sensor, connected to the feedback input of the processor that is configured to automatically affect the sequence of time segments taken from the master file.

18. The method according to claim 15, further comprising providing an information input device connected to a processor feedback input of the processor that enables a change to the sequence of time segments taken from the master file, and operationally interrupts execution of the executable file.

19. The method according to claim 16, further comprising at least one of: a light sensor, a geolocation sensor, a participant voice sound recognition device, an external environment sound recognition device, a participant positioning sensor, an object positioning sensor, a participant psychoemotional state data sensor, and a physical state data sensor, configured to provide feedback input of the at least one hardware processor, the at least one hardware processor being further directed to automatically affect the sequence of time segments taken from the master file based on the feedback input.

20. The method according to claim 16, further comprising an information input device connected to a processor feedback input of the processor that enables a change to the sequence of time segments taken from the master file, and operationally interrupts execution of the executable file.

* * * * *